Figure 1:
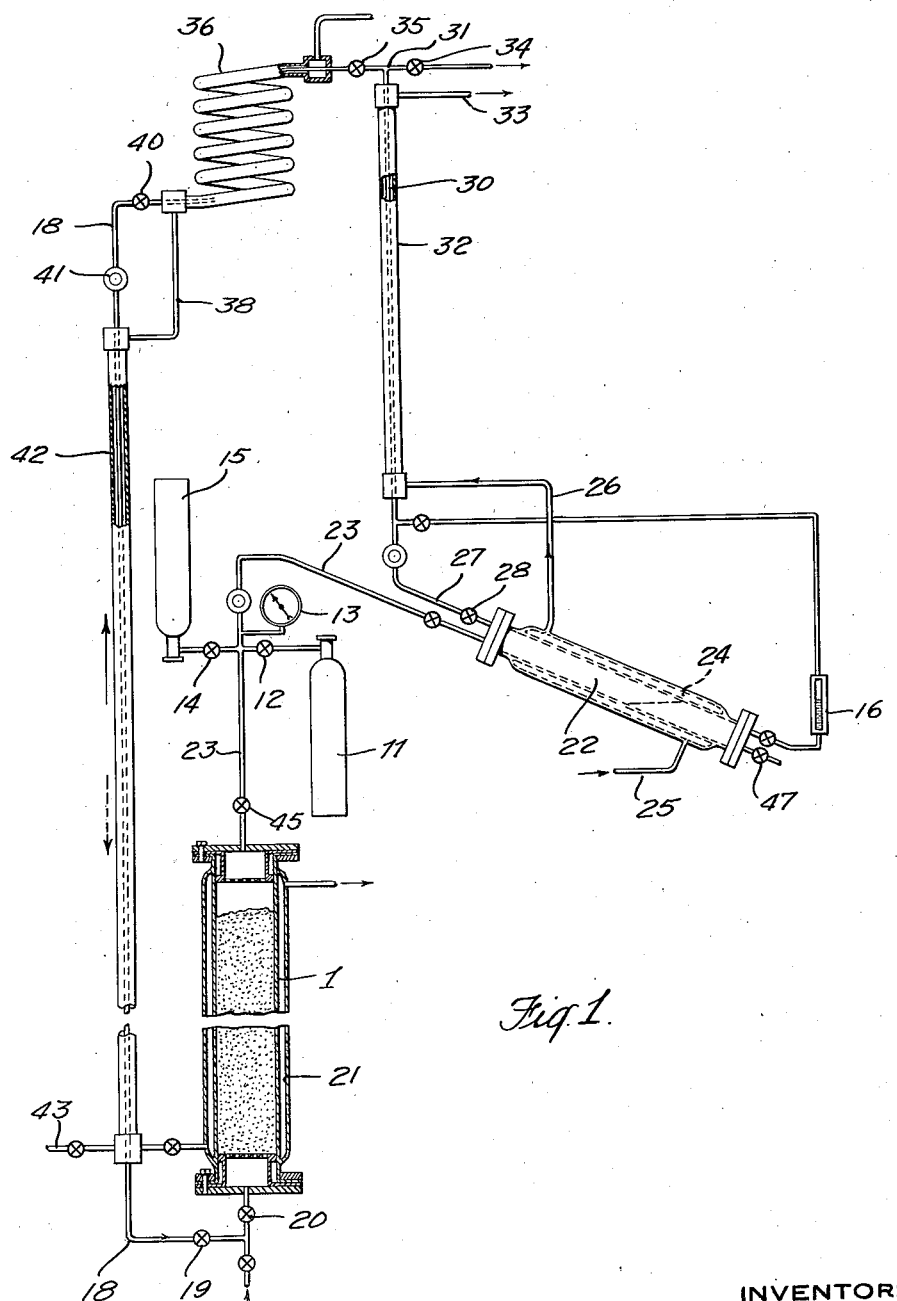

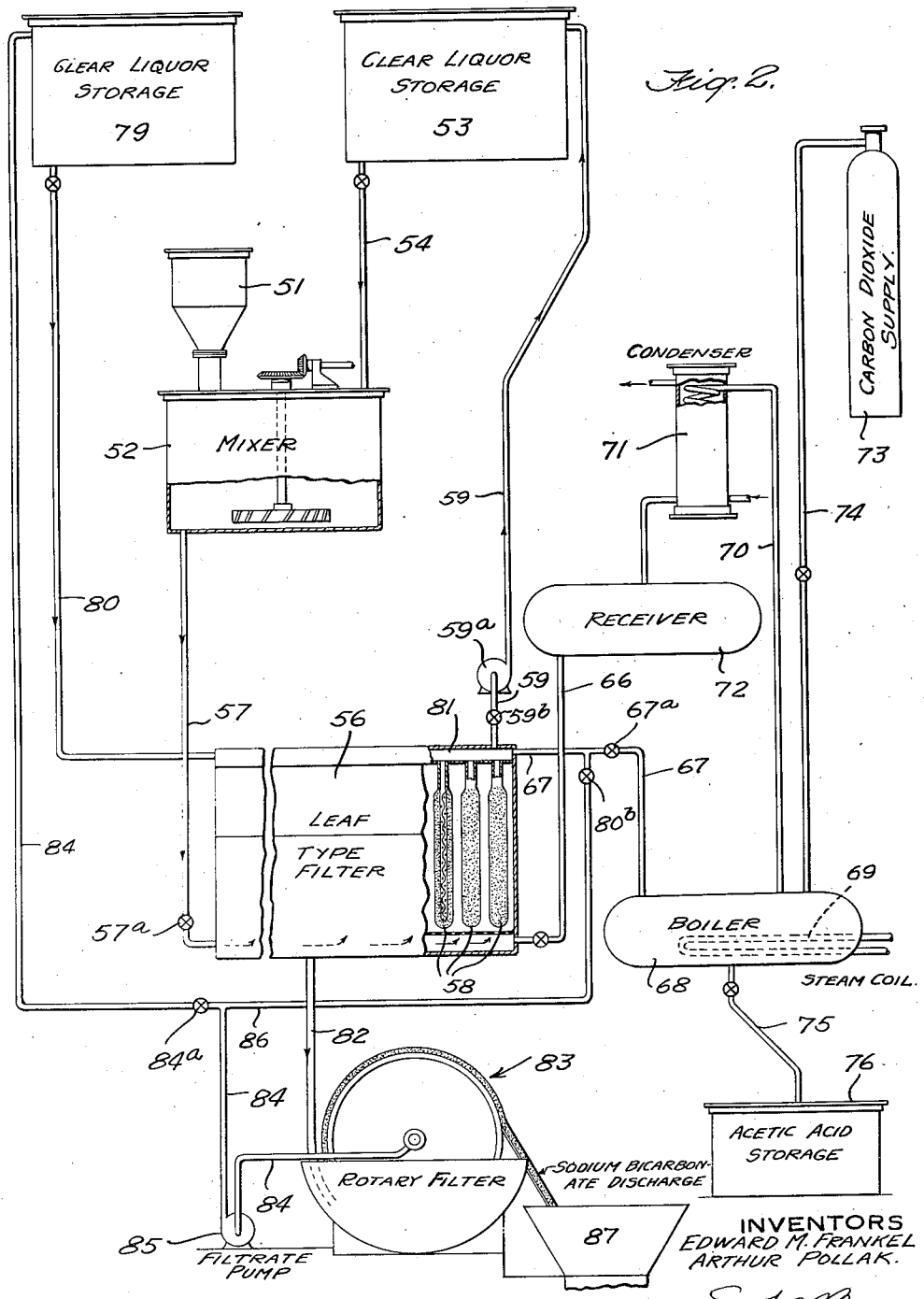

Patented Feb. 18, 1941

2,231,898

UNITED STATES PATENT OFFICE 2,231,898

RECOVERY OF ACIDS

Edward M. Frankel, Cedarhurst, Md., and Arthur Pollak, New York, N. Y., assignors to West Virginia Pulp and Paper Company, New York, N. Y., a corporation of Delaware Application May 7, 1938, Serial No. 206,564

20 Claims. (Cl. 260—541)

Our invention relates to the recovery of organic acids from their corresponding salts. In carrying out our invention we decompose the salt with an acid which is normally gaseous and whose activity can be varied by pressure to be greater or less than the activity of the acid being recovered. Further conditions to be satisfied are that the released acid be soluble in the liquefied gaseous reactant, and that the salt which is to be decomposed be relatively insoluble therein. A typical example of the improved method is the recovery of acetic acid from sodium acetate by the use of carbon dioxide wherein the liquefied $CO_2$ reacts with the sodium acetate in the presence of sufficient water to liberate acetic acid which immediately dissolves in the excess liquefied $CO_2$ and is thereby removed from the zone of the reaction by removal of the excess liquefied $CO_2$. The latter is then brought to a distilling zone and the $CO_2$ distilled off, leaving the acetic acid to be recovered. Sodium bicarbonate is formed in the reaction zone and is from time to time removed.

Many attempts have been made to recover acetic acid from the corresponding sodium, calcium or other salts by the use of liquefied carbon dioxide. Thus, Ipatiew, Journal of Russian Physical Chemical Soc., vol. 45, page 992 (1913), subjected acetate solutions to the action of $CO_2$ under a pressure of about 800 pounds at about 90° C., and reported a recovery of 1 gram calcium carbonate from 50 cc. of a 12% solution of calcium acetate after seven days. Others have worked with liquid carbon dioxide in organic solvents, e. g., Woodruff et al., U. S. Patent 1,946,419.

Our present invention differs from the foregoing essentially in that we have succeeded in getting the reaction to go substantially to completion by taking advantage of the solubility of the released acid in the liquefied acid gas to remove the same substantially as fast as it is formed. By proceeding in this manner we have been able to get nearly quantitative yields of acetic acid, for example, from its sodium and calcium salts. In recovering the gaseous reactant by distillation, it will be noted that in the usual case where the reactant is a gas at room temperature and pressure, the liquefied material may be handled close to its critical temperature, which means that the latent heat of the substance is extremely low, so that very little heat would be needed to evaporate off the liquefied gas from the acid to be recovered; and by the same reasoning not much cooling will be required to convert the vapor of the acid gas back into liquid. It is evident that such considerations when availed of make for highly economical operation of the process.

Our invention also includes recovery of acids in dilute or crude state by a cycle of reactions including the foregoing, in which the acid to be recovered is first neutralized by a salt of the gaseous reactant, with recovery of the salt formed of the acid whose recovery is sought and of the gas liberated, followed by decomposition of the recovered salt by the gaseous reactant in liquefied form. This results in the recovery of the original acid in relatively pure and concentrated form and of the salt of the gaseous reactant which is now used to recommence the cycle.

Our invention will be best understood by reference to the following detailed description taken with the annexed drawings in which Fig. 1 shows an arrangement of apparatus suitable for recovering acetic acid from acetate salts.

Fig. 2 shows an arrangement of apparatus providing for a continuous method of recovery of acetic acid from its salts.

In carrying out the invention sodium acetate, for example, is placed in the extractor 1, Fig. 1. The form of the sodium acetate may vary, as will be pointed out hereinafter; preferably solid crystals are used having an average water content corresponding to the formula $NaC_2H_3O_2.H_2O$ to $NaC_2H_3O_2.3H_2O$. The system is then pressured by carbon dioxide from the cylinder 11 by opening valve 12. When the pressure has reached the maximum as denoted by the gauge 13, say 700–1000 lbs. per square inch depending upon the temperature, the valve 12 is closed and valve 14 is opened permitting liquid $CO_2$ from the inverted cylinder 15 to flow to the apparatus and fill the same to some such level as shown in the sight glass 16. Valve 14 is then closed and liquid $CO_2$ is caused to flow from pipe 18 (in the manner to be subsequently explained) through valves 19 and 20 through the material in the extractor 1 which is maintained at a desired temperature by means of water in the jacket 21. The flow of liquid $CO_2$ is continued until the same now bearing some acetic acid by reaction of the sodium acetate in the extractor 1 reaches the boiler 22 through pipe 23. Boiler 22 is provided with jacket 24 through which is circulated hot water entering through pipe 25 and leaving through pipe 26. As soon as liquid $CO_2$ has reached boiler 22 distillation is started by the heat from the water in the jacket 24, the $CO_2$ vapor leaving the boiler through pipe 27 and valve 28 and passing upwardly through the riser 30 to T 31. Riser 30 preferably has a jacket 32 through which the water from pipe 26 leading from jacket 24 circulates, such water leaving through pipe 33.

Valve 34 being closed and valve 35 open, the CO₂ vapor now passes through condenser 36 formed of concentric inner and outer pipes within the outer of which flows cooling water from pipe 38. The CO₂ is condensed in the inner coil, passes out of the condenser through pipe 18 having valve 40 and sight box 41. Pipe 18 also has a jacket 42 through which cooling water passes from pipe 43 before it passes to pipe 38 connecting jacket 42 and outer pipe of condenser 36.

Because of the head of CO₂ liquid in the pipe 18 above the boiler 22, positive circulation of liquid CO₂ takes place through extractor 1. Pipe 18 thus also serves as a reservoir of liquid extractant. When extraction is complete the boiler 22 is depressured by opening valve 34 and closing valve 45 in the line 23 and valve 35 following the cooler 36. After the excess pressure has been removed, the acetic acid is drained through the valve 47.

In carrying out the invention according to Fig. 2 sodium acetate, for example, from container 51 is mixed in mixer 52 with a medium which is preferably a saturated solution of sodium acetate fed from the tank 53 by means of pipe 54. Any other suitable medium or vehicle may be employed which does not interfere with the reaction, as for example, kerosene or other hydrocarbon liquid. The slurry produced is then fed to the extractor 56 through pipe 57, valve 57a being open. This extractor may be of various types, a preferred one of which is a filter press, as for example of the Sweetland or leaf type, consisting of a set of filter leaves housed in a pressure type shell. The sodium acetate slurry is allowed to build up on the leaves 58 of the filter press, the filtered liquid leaving the extractor through pipe 59 by means of which it passes back to tank 53 aided by pump 59a, valve 59b being open. When a filter cake of satisfactory dimensions has been built up in the extractor 56 valves 57a and 59b are closed whereupon liquid carbon dioxide from the receiver 72 is introduced into the extractor (externally of leaves 58) through pipe 66. The liquid CO₂ reacts with the sodium acetate in extractor 56 by simple double decomposition, as already mentioned, forming acetic acid which is dissolved in the liquid extractant, leaving behind the decomposition product, sodium bicarbonate. The extractant now flows out of the extractor 56 through pipe 67 to boiler 68, valve 67a being open and valve 80b being closed. Here sufficient heat is provided by means of steam coil 69 to vaporize off the liquid extractant, leaving the acetic or other organic acid behind in the boiler 68. The gaseous vapors leave the boiler through pipe 70, are condensed in condenser 71 and are collected in receiver 72 from which the liquid extractant again passes to the extractor 56. The CO₂ may be replenished to the boiler 68 as needed from the tank 73 through pipe 74. After the suitable concentration of acetic acid has built up in the boiler 68, it is removed therefrom through pipe 75 and collected in receiver 76. Also, the mixture of sodium bicarbonate formed and unreacted upon sodium acetate may be removed, preferably as slurry, by back washing the filter 56 with liquor (containing mostly sodium bicarbonate) from the tank 79, which liquor passes through pipe 80 to the manifold 81, the resulting slurry passing through pipe 82 to a filter 83 preferably of the Oliver or rotary type, the filtrate being pumped back through pipe 84 by pump 85 either to manifold 81 through pipe 86 or directly to tank 79, the appropriate valves shown, 84a and 80b, being manipulated as required. The solid product of the reaction, sodium bicarbonate, containing some unreacted upon sodium acetate is delivered from filter 83 into hopper 87.

In decomposing the alkali metal salts with carbon dioxide with liberation of the corresponding acid, one molecule of water is required for each molecule of acid produced in accordance with the equation $$NaC_2H_3O_2 + H_2O + CO_2 \rightarrow HC_2H_3O_2 + NaHCO_3$$

In reacting with calcium salt one molecule of water produces two molecules of acetic acid, the reaction being as follows:

$$Ca(C_2H_3O_2)_2 + H_2O + CO_2 \rightarrow 2HC_2H_3O_2 + CaCO_3$$

Therefore, it is necessary to have a certain amount of water present. However, water greatly in excess of the theoretical quantity cuts down the yield. The best results have been obtained using from 100 to 300% or more water based upon the amount theoretically required. Sodium acetate occurs in the form of $NaC_2H_3O_2.3H_2O$ and satisfactory results have been obtained by using this quantity of water as well as that corresponding to $NaC_2H_3O_2H_2O$. This salt does not occur naturally, but the present purpose is served by mixing the quantities of anhydrous sodium acetate and $NaC_2H_3O_2.3H_2O$ in amounts to give $NaC_2H_3O_2.H_2O$. In carrying out the reaction upon sodium acetate 3H₂O with liquid CO₂ we have had a yield of 85% acetic acid in a run lasting five hours. Working with liquid CO₂ a pressure is necessary of 600–1000 pounds, the temperature being kept slightly below the critical temperature of 31° C. The particle size of the sodium acetate may be 80 mesh or finer, good results being had with the smaller mesh sizes provided there is sufficient head of the liquid CO₂ to afford the desired rapidity of circulation. The strength of acid recovered is as high as 95%. Substantially the same results are to be had using calcium acetate.

The use of sulfur dioxide instead of carbon dioxide was found to give equally good if not superior results with the advantage that lower pressures are involved, since the working pressure of sulfur dioxide may be taken as around 100 lbs. per square inch as against as high as 1000 lbs. per square inch for carbon dioxide. The corresponding reaction is as follows:

$$NaC_2H_3O_2 + H_2O + SO_2 \rightarrow HC_2H_3O_2 + NaHSO_3$$

The advantage of using a normally weak acid as the active agent is, first, the reaction product is relatively valuable, e. g., sodium bicarbonate, sodium bisulfite; and secondly, salt so obtained can in many instances be used to recover the acid which is sought in concentrated form. For example, sodium bicarbonate may under certain conditions be used to recover acetic acid itself with liberation of carbon dioxide, which in turn may be recovered and used in the cycle. Thus, in the distillation of wood, the so called pyroligneous liquor obtained is neutralized with sodium bicarbonate, the solution evaporated either to dryness or to a point where sodium acetate will crystallize out and the sodium acetate decomposed into sodium bicarbonate and acetic acid in the manner described. This recovery cycle of acetic acid recovery may profitably be employed even though the sodium acetate is not quantitatively decomposed, any remaining sodium acetate being added along with the sodium bicarbonate to a fresh supply of pyroligneous liquor. In a similar manner the present invention may be applied to other sources of acetic acid. Similarly, solutions of acetic acid may be neutralized with sodium bisulfite, with recovery of sodium acetate and sulfur dioxide, which thereupon may be liquefied and used to liberate relatively pure concentrated acetic acid with formation of sodium bisulfite in the manner above described.

In contrast to the end products obtained by the use of $CO_2$ and $SO_2$, for example, those obtained by the use of the heavy or strong acids, such as sulfuric, phosphoric, hydrochloric, are of relatively little value. Thus, if sodium acetate is decomposed with sulfuric acid, an end product is sodium sulfate or sodium acid sulfate, which is of relatively little value, the same being true of sodium phosphate and sodium chloride.

We believe that the principle of our invention is of broad application to the recovery of acids of varied nature. The first requisite is that the liquefied reactant under the conditions of use by a stronger acid than the acid whose recovery is sought. Thus, liquefied $CO_2$ is insufficiently active to decompose the alkali formates, whereas such reaction is readily accomplished with liquefied $SO_2$. On the other hand, salts of propionic acid and those higher in the series being less active than acetic acid, are readily decomposed by liquefied $CO_2$. The only other conditions which must be met for the reaction to succeed are (2) the released acid be soluble in the liquefied acid gas, and (3) the resulting salt of the reaction be relatively insoluble in the liquefied acid. Among other acids or acid substances having the requisite ionization constants to serve as reactants may be mentioned hydrogen cyanide, HCN, hydrogen sulfide, $H_2S$, etc.

In the claims, alkali forming metal is to be understood to cover both the alkali metals and the alkaline earth metals. It will be understood that various changes in the method of carrying out our invention will occur to those skilled in the art, without, however, departing from the spirit of our invention or from the scope of the appended claims.

We claim:

1. In a method of deriving a carboxylic organic acid from a salt thereof, the steps which consist in subjecting said salt in the presence of sufficient water to furnish the water of reaction, to the action of $CO_2$ in liquid form under pressure in which the acid to be liberated is soluble, removing the liquefied $CO_2$ containing the dissolved liberated acid, and recovering said acid from said liquefied $CO_2$.

2. In a method of deriving a carboxylic organic acid from a salt thereof, the steps which consist in subjecting said salt in the presence of sufficient water to furnish the water of reaction, to the action of $CO_2$ in liquid form under pressure in which the acid to be liberated from said salt is soluble, continuously removing the liquefied $CO_2$ containing the dissolved liberated acid, and recovering said acid.

3. In a method of deriving acetic acid from the acetates of the alkali forming metals, the steps which consist in subjecting such acetates in the presence of sufficient water to furnish the water of reaction, to the action of liquefied $CO_2$ at a temperature lower than the critical temperature for $CO_2$ and under a pressure corresponding to a vapor pressure of the liquefied $CO_2$ at such temperature, removing the liquefied $CO_2$ containing the dissolved liberated acetic acid and recovering said acid by distillation of the acetic acid-enriched liquefied $CO_2$.

4. In a method of deriving acetic acid from the acetates of the alkali forming metals, the steps which consist in subjecting such acetates in the presence of sufficient water to furnish the water of reaction, to the action of liquefied $SO_2$, removing the liquefied $SO_2$ containing the dissolved liberated acetic acid and recovering said acid by distillation of the acetic acid-enriched liquefied $SO_2$.

5. The method of deriving acetic acid from acetates, which consists in conveying a solid alkali metal acetate in the form of a slurry in a liquid vehicle to the reaction zone in which said solid material is retained, said solid material containing not substantially more water than is necessary to furnish the water of reaction, subjecting said material to the action of a stream of liquefied $CO_2$, removing said liquefied $CO_2$ together with the released acetic acid dissolved therein, separating said liquefied $CO_2$ from the acetic acid with recovery of acetic acid, and removing the solid reaction products in said reaction zone with recovery of the corresponding salt of reaction.

6. The method according to claim 5, in which said liquid vehicle after it has conveyed solid alkali metal acetate to the reaction zone, is used to convey fresh quantities of solid alkali metal acetate to be decomposed to said zone.

7. The method which comprises reacting in aqueous solution an acid (A) and a salt of an acid formed in water of a normally gaseous acid substance (B), which substance when dissolved in water at atmospheric pressure has a weakly acid reaction which is weaker than that of acid (A), but which in liquefied form has sufficient acid reactivity to decompose salts of acid (A), recovering from the above stated reaction a corresponding salt of acid (A) with liberation of acid substance (B), reacting said recovered salt of acid (A) with acid substance (B) in liquefied form under pressure and in the presence of sufficient water to maintain the reaction, under which conditions the activity of acid substance (B) is sufficient to liberate acid (A), removing from the zone of reaction acid substance (B) in liquefied form with acid (A) dissolved therein, and separating acid (A) from acid substance (B).

8. The method according to claim 7 in which acid A is neutralized with an alkali forming metal salt of acid substance B.

9. In a method of deriving a free acid from a salt thereof, the steps which consist in subjecting said salt in the presence of sufficient water to maintain the reaction, to the action of a gaseous acid substance in the liquefied state in which the acid to be liberated is soluble and the salt formed by decomposition is relatively insoluble, which substance when dissolved in water at atmospheric pressure has a weakly acid reaction but which in liquefied form has sufficient acid reactivity under the stated conditions to decompose said salt and liberate the acid thereof, removing from time to time during the course of the reaction from the zone of reaction the liquefied gas containing the released acid in solution, and recovering therefrom said released acid.

10. In a method of deriving a free acid from a salt thereof, the steps which consist in subjecting said salt in the presence of water in an amount to maintain the reaction, but insufficient to retard the reaction substantially, to the action of a gaseous acid substance in the liquefied state in which the acid to be liberated is soluble and the salt formed by decomposition is relatively insoluble, which substance when dissolved in water at atmospheric pressure has a weakly acid reaction but which in liquefied form has sufficient acid reactivity under the stated conditions to decompose said salt and liberate the acid thereof, removing during the course of the reaction from the zone of reaction the liquefied gas containing the released acid in solution, and recovering therefrom said released acid.

11. In a method of deriving a carboxylic organic acid from a salt thereof, the steps which consist in subjecting said salt in the presence of sufficient water to maintain the reaction, to the action of a gaseous acid substance in the liquefied state in which the acid to be liberated is soluble and the salt formed by decomposition is relatively insoluble, which substance when dissolved in water at atmospheric pressure has a weakly acid reaction but which in liquefied form has sufficient acid reactivity under the stated conditions to decompose said salt and liberate the acid thereof, removing from time to time during the course of the reaction from the zone of reaction the liquefied gas containing the released acid in solution, and recovering therefrom said released acid.

12. In a method of deriving a carboxylic organic acid from the corresponding salt of an alkali forming metal, the steps which consist in subjecting said salt in the presence of sufficient water to furnish the water of reaction, to the action of $SO_2$ in liquid form under pressure in which the acid to be liberated from said salt is soluble, continuously removing the liquefied $SO_2$ containing the dissolved liberated acid, and recovering said acid.

13. The method of deriving acetic acid from acetates, which consists in conveying a solid alkali metal acetate in the form of a slurry in a liquid vehicle to the reaction zone in which said solid material is retained, said solid material containing not substantially more water than is necessary to furnish the water of reaction, subjecting said material to the action of a stream of liquefied $SO_2$, removing said liquefied $SO_2$ together with the released acetic acid dissolved therein, separating said liquefied $SO_2$ from the acetic acid with recovery of acetic acid, and removing the solid reaction products in said reaction zone with recovery of the corresponding salt of reaction.

14. The method according to claim 13, in which said liquid vehicle after it has conveyed solid alkali metal acetate to the reaction zone, is used to convey fresh quantities of solid alkali metal acetate to be decomposed to said zone.

15. The method which comprises reacting in aqueous solution an acid (A) with a salt of an acid formed by the presence in water of $CO_2$, thereby recovering the corresponding salt of acid A with the liberation of $CO_2$, reacting said salt of acid A with $CO_2$ in liquefied form under pressure in the presence of sufficient water to maintain the reaction, under which condition the activity of the $CO_2$ is sufficient to liberate acid A, removing from the zone of reaction the $CO_2$ in liquefied form with acid A dissolved therein, and separating acid A from said liquefied $CO_2$.

16. The method according to claim 15 in which in the first step acid A in aqueous solution is neutralized with an alkali forming metal salt of carbonic acid.

17. The method which comprises reacting in aqueous solution an acid (A) with a salt of an acid formed by the presence in water of $SO_2$, thereby recovering the corresponding salt of acid A with the liberation of $SO_2$, reacting said salt of acid A with $SO_2$ in liquefied form under pressure in the presence of sufficient water to maintain the reaction, under which condition the activity of the $SO_2$ is sufficient to liberate acid A, removing from the zone of reaction the $SO_2$ in liquefied form with acid A dissolved therein, and separating acid A from said liquefied $SO_2$.

18. The method according to claim 17 in which in the first step acid A in aqueous solution is neutralized with an alkali forming metal salt of an acid formed by dissolving $SO_2$ in water.

19. In a method of deriving acetic acid from acetates of the alkali forming metals, the steps which consist in subjecting such acids in the presence of water in an amount between one and not substantially in excess of three mols per mol of acetate, to the action of liquefied $CO_2$ at a temperature lower than the critical temperature for $CO_2$ and under a pressure corresponding to a vapor pressure of the liquefied $CO_2$ at such temperature, removing the liquefied $CO_2$ containing the dissolved, liberated acetic acid, and recovering such acid by distillation of the acetic acid-enriched liquefied $CO_2$.

20. In a method of deriving acetic acid from acetates of the alkali forming metals, the steps which consist in subjecting such acetates in the presence of water in an amount between one and not substantially in excess of three mols per mol of acetate, to the action of liquefied $SO_2$, removing the liquefied $SO_2$ containing the dissolved acetic acid, and recovering said acid by distillation of the acetic acid-enriched liquefied $SO_2$.

EDWARD M. FRANKEL.
ARTHUR POLLAK.